United States Patent
Zhou

(10) Patent No.: US 12,322,370 B1
(45) Date of Patent: Jun. 3, 2025

(54) ACOUSTIC ECHO CANCELLATION AND LOUDSPEAKER LINEARIZATION

(71) Applicant: Meta Platforms Technologies, LLC, Menlo Park, CA (US)

(72) Inventor: Limin Zhou, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 355 days.

(21) Appl. No.: 18/086,523

(22) Filed: Dec. 21, 2022

Related U.S. Application Data

(60) Provisional application No. 63/342,821, filed on May 17, 2022.

(51) Int. Cl.
  *G10K 11/178* (2006.01)
  *G10L 15/22* (2006.01)

(52) U.S. Cl.
  CPC .. *G10K 11/17854* (2018.01); *G10K 11/17823* (2018.01); *G10L 15/22* (2013.01); *G10L 2015/223* (2013.01)

(58) Field of Classification Search
  CPC ........ G10K 11/17854; G10K 11/17823; G10L 15/22; G10L 2015/223; H04R 3/04; H04R 29/001; H04R 9/06; H04R 3/007
  See application file for complete search history.

(56) References Cited

U.S. PATENT DOCUMENTS

| | | | | |
|---|---|---|---|---|
| 11,425,476 | B2* | 8/2022 | Christoph | H04R 29/003 |
| 2012/0294437 | A1* | 11/2012 | Haddad | H03G 3/3089 |
| | | | | 379/406.05 |
| 2019/0222939 | A1* | 7/2019 | Brunet | H04R 9/06 |
| 2023/0065067 | A1* | 3/2023 | Sconza | G10K 11/17881 |
| 2024/0007789 | A1* | 1/2024 | Hirose | H04M 9/082 |

FOREIGN PATENT DOCUMENTS

| | | | | |
|---|---|---|---|---|
| CN | 104980877 A | * | 10/2015 | H04R 3/04 |
| CN | 109246548 B | * | 11/2021 | G10K 11/175 |
| CN | 110169041 B | * | 3/2022 | G06F 3/165 |

\* cited by examiner

*Primary Examiner* — David L Ton
(74) *Attorney, Agent, or Firm* — Greenberg Traurig, LLP

(57) ABSTRACT

An audio controller comprising a nonlinear loudspeaker system; an acoustic sensor; and an audio controller is disclosed. The audio controller performs acoustic echo cancellation with loudspeaker linearization. In particular, the audio controller is configured to: generate a pre-distorted signal from an input signal that keeps the nonlinear loudspeaker system in a linear regime, deliver, via the loudspeaker system, audio content in the linear regime using the pre-distorted signal, capture, via the acoustic sensor, an overall signal comprising an acoustic path response of the delivered audio content and a target signal, filter out the acoustic path response of the delivered audio content from the overall signal yielding isolated target signal, and perform an action with the isolated target signal.

20 Claims, 8 Drawing Sheets

600

Generate a pre-distorted signal from an input signal that keeps a nonlinear loudspeaker system in a linear regime
610

Deliver, via the loudspeaker system, audio content in the linear regime using the pre-distorted signal
620

Perform system identification and parameter updating
630

Capture, via an acoustic sensor, an overall signal comprising an acoustic path response of the delivered audio content and a target signal
640

Filter out the acoustic path response of the delivered audio content from the overall signal yielding isolated target signal
650

Perform an action with the isolated target signal
660

FIG. 6

ACOUSTIC ECHO CANCELLATION AND LOUDSPEAKER LINEARIZATION

CROSS-REFERENCE TO RELATED APPLICATIONS

This application claims the benefit of U.S. Provisional Application No. 63/342,821, filed on May 17, 2022, which is incorporated by reference in its entirety.

FIELD OF THE INVENTION

This disclosure relates generally to artificial reality systems, and more specifically to acoustic echo cancellation in nonlinear loudspeaker systems used in artificial reality systems.

BACKGROUND

In a two-way audio device, configured to deliver audio content and to capture a target signal, the audio device performs acoustic echo cancellation to ensure the echoes of the delivered audio content are not captured in the target signal. In particular with nonlinear loudspeaker systems implemented in a two-way audio device, the audio device relies on a two-step echo cancellation process. In the first step, the system utilizes a linear adaptive filter for linear echo cancellation. In the second step, the system utilizes a residual echo suppressor which attenuates the target signal after the linear adaptive filter and prevents the residual echo, both linear and nonlinear, from passing through. One drawback in residual echo suppression is the removal of both nonlinear distortion echo and the desired target signal. Another drawback in residual echo suppression is that the two-step echo cancellation process is susceptible to computation delays causing unreliable estimations and other reliability issues. On the other hand, forgoing residual echo suppression leaves the nonlinear distortion echo to muddle the desired target signal.

SUMMARY

An audio system performs acoustic echo cancellation on a captured signal with loudspeaker linearization. The audio system may comprise one or more loudspeaker systems, one or more acoustic sensors, and an audio controller. The loudspeaker system may be a nonlinear loudspeaker system, i.e., a loudspeaker system wherein some portion of audio content presented is in the nonlinear regime. To prevent the nonlinear loudspeaker system from delivering audio content in the nonlinear regime (i.e., to keep the audio content in the linear regime), the audio controller may perform loudspeaker linearization. Loudspeaker linearization involves modifying the input signal to form a pre-distorted signal that, when delivered by the nonlinear loudspeaker system, is in the linear regime. With signal captured by the acoustic sensor, the audio controller also applies an acoustic echo cancellation to filter out the linear acoustic path response to isolate the desired target signal. The acoustic echo cancellation may comprise linear adaptive filtering based on the input signal as a reference to determining an expected acoustic path response. The audio controller may then perform subsequent actions with the isolated target signal.

In a first aspect, a computer-implemented method is disclosed comprising: generating a pre-distorted signal from an input signal that keeps a nonlinear loudspeaker system in a linear regime; delivering, via the loudspeaker system, audio content in the linear regime using the pre-distorted signal; capturing, via an acoustic sensor, an overall signal comprising an acoustic path response of the delivered audio content and a target signal; filtering out the acoustic path response of the delivered audio content from the overall signal yielding isolated target signal; and performing an action with the isolated target signal.

In a second aspect, a non-transitory computer-readable storage medium is disclosed, storing instructions that, when executed by a computer processor, cause the computer processor to: generate a pre-distorted signal from an input signal that keeps a nonlinear loudspeaker system in a linear regime; deliver, via the loudspeaker system, audio content in the linear regime using the pre-distorted signal; capture, via an acoustic sensor, an overall signal comprising an acoustic path response of the delivered audio content and a target signal; filter out the acoustic path response of the delivered audio content from the overall signal yielding isolated target signal; and perform an action with the isolated target signal.

In a third aspect, an audio system is disclosed comprising: a nonlinear loudspeaker system; an acoustic sensor; and an audio controller configured to: generate a pre-distorted signal from an input signal that keeps the nonlinear loudspeaker system in a linear regime, deliver, via the loudspeaker system, audio content in the linear regime using the pre-distorted signal, capture, via the acoustic sensor, an overall signal comprising an acoustic path response of the delivered audio content and a target signal, filter out the acoustic path response of the delivered audio content from the overall signal yielding isolated target signal, and perform an action with the isolated target signal.

BRIEF DESCRIPTION OF THE DRAWINGS

FIG. 6 is a flowchart describing a method of delivering audio content relying on linearization of a nonlinear loudspeaker system and linear acoustic echo cancellation of a target signal, in accordance with one or more embodiments.

Figure 1A:
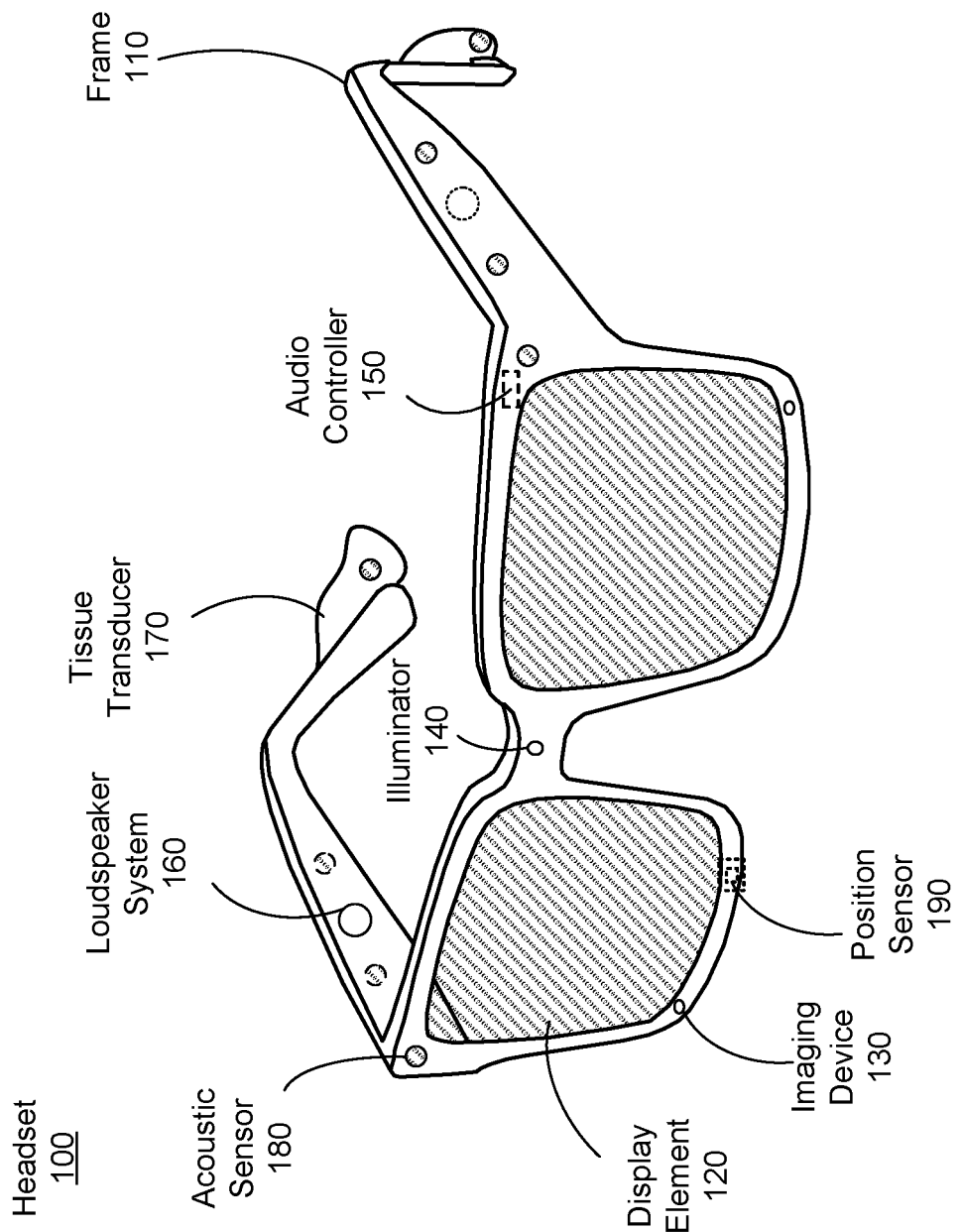
FIG. 1A is a perspective view of a headset implemented as an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

An audio system performs acoustic echo cancellation on a captured signal with loudspeaker linearization. An audio system may comprise one or more loudspeaker systems, one or more acoustic sensors, and an audio controller. The loudspeaker system may be a nonlinear loudspeaker system, i.e., a loudspeaker system wherein some portion of audio content presented is in the nonlinear regime.

To prevent the nonlinear loudspeaker system from delivering audio content in the nonlinear regime (i.e., to keep the audio content in the linear regime), the audio controller may perform loudspeaker linearization. Loudspeaker linearization involves modifying the input signal to form a pre-distorted signal that, when delivered by the nonlinear loudspeaker system, is in the linear regime. The audio controller may further perform loudspeaker system identification and parameter updating to ensure the loudspeaker system is operating as intended.

The acoustic sensor captures an overall signal from the environment comprising an acoustic path response of the delivered audio content and a desired target signal (e.g., user speech). The acoustic path response of the delivered audio content comprises one or more echoes of the audio content reflected off surfaces in the environment of the audio system. As the delivered audio content is linearized, so too is the acoustic path response.

The audio controller applies an acoustic echo cancellation to filter out the linear acoustic path response to isolate the desired target signal. As there is no nonlinear response, the audio controller can better isolate the target signal, e.g., retaining more of the target signal and with higher accuracy. The acoustic echo cancellation may comprise linear adaptive filtering based on the input signal as a reference to determining an expected acoustic path response. The linear adaptive filtering may also be adjustable based on difference of the overall signal captured by the acoustic sensor and the input signal used in driving the loudspeaker system. The audio controller may then perform subsequent actions with the isolated target signal. Example actions include performing a voice command, transmitting the isolated target signal as part of a telecommunication, other actions as part of an augmented reality system utilizing the isolated target signal, etc.

Artificial Reality Implementations

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system may further capture audio from the environment, e.g., a user's voice, ambient noise, other noise present in the environment, etc. In embodiments with two-way functionality, the audio system may be configured to perform linear acoustic echo cancellation and/or linearization of the loudspeaker system to optimally remove echo from a target signal captured by the audio system. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a loudspeaker system 160 or a tissue transducer 170 (e.g., a bone conduction transducer or a cartilage conduction transducer). Although the loudspeaker systems 160 are shown exterior to the frame 110, the loudspeaker systems 160 may be enclosed in the frame 110. In some embodiments, instead of individual loudspeakers for each ear, the headset 100 includes a loudspeaker array comprising multiple loudspeaker systems integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 manages operation of other components of the audio system. In one or more embodiments, the audio controller 150 performs loudspeaker linearization of nonlinear loudspeaker systems. Nonlinear loudspeaker systems refer to loudspeaker systems that generate nonlinear distortions, which may be in addition to linear outputs. Example nonlinear loudspeaker systems may arise in contexts with loudspeaker systems having small form factors that are driven at high voltages to maximize sound output. The audio controller 150 may also perform acoustic echo cancellation, e.g., via a linear adaptive filter. The audio controller 150 may also perform loudspeaker system identification and dynamic updating of loudspeaker system parameters. The audio controller 150 may adjust the loudspeaker system parameters to improve precision in sound generation by the loudspeaker systems 160. Further details regarding the various functionality of the audio controller 150 are described below in conjunction with FIGS. 2-5. The audio controller 150 may also process information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the loudspeaker systems 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
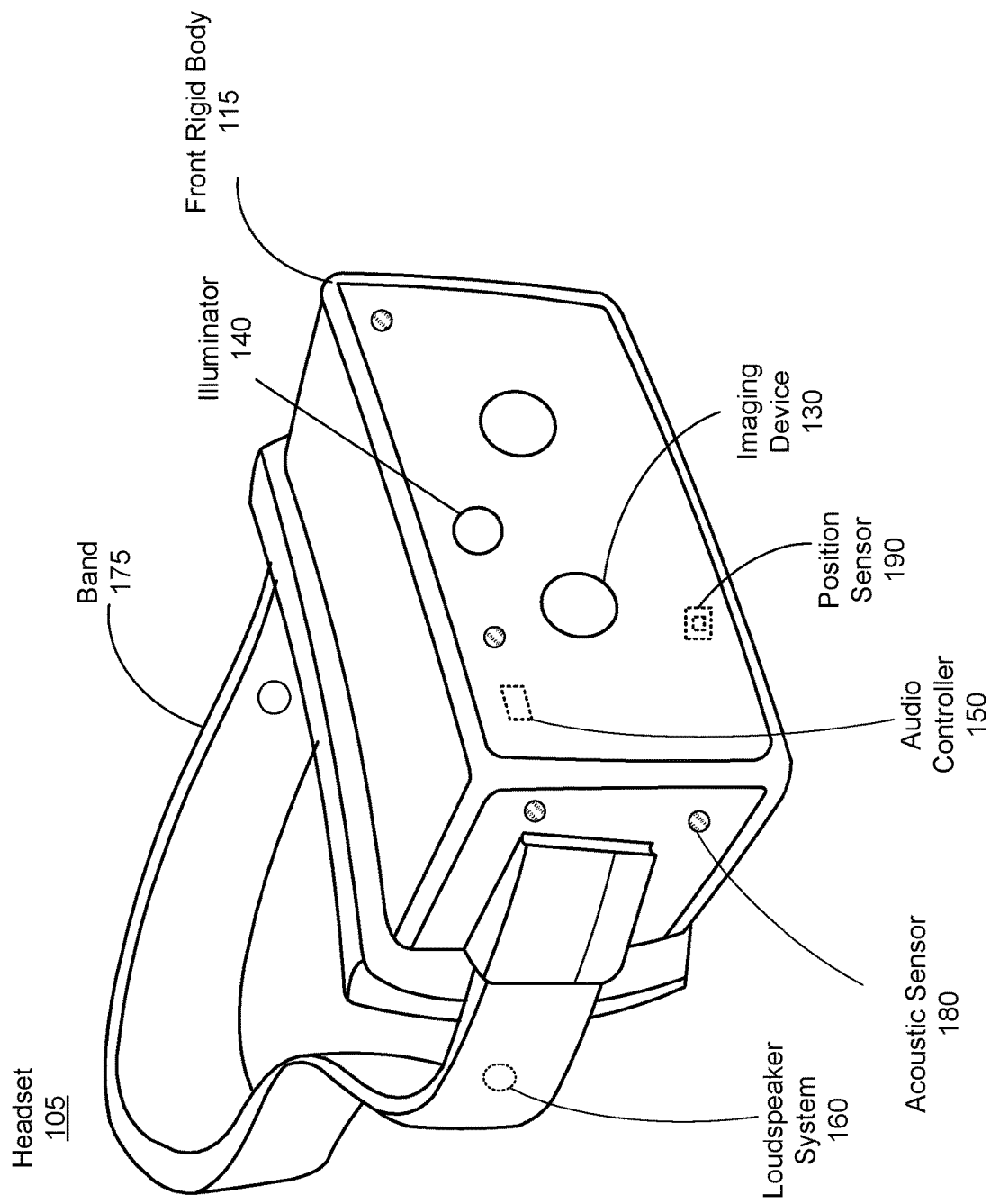
FIG. 1B is a perspective view of a headset implemented as a HMD, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the loudspeaker systems 160, a plurality of the imaging devices 130, a plurality of acoustic sensors 180, and the position sensor 190. The loudspeaker systems 160 may be located in various locations, such as coupled to the band 175 (as shown), coupled to front rigid body 115, or may be configured to be inserted within the ear canal of a user.

Audio System Architecture

Figure 2:
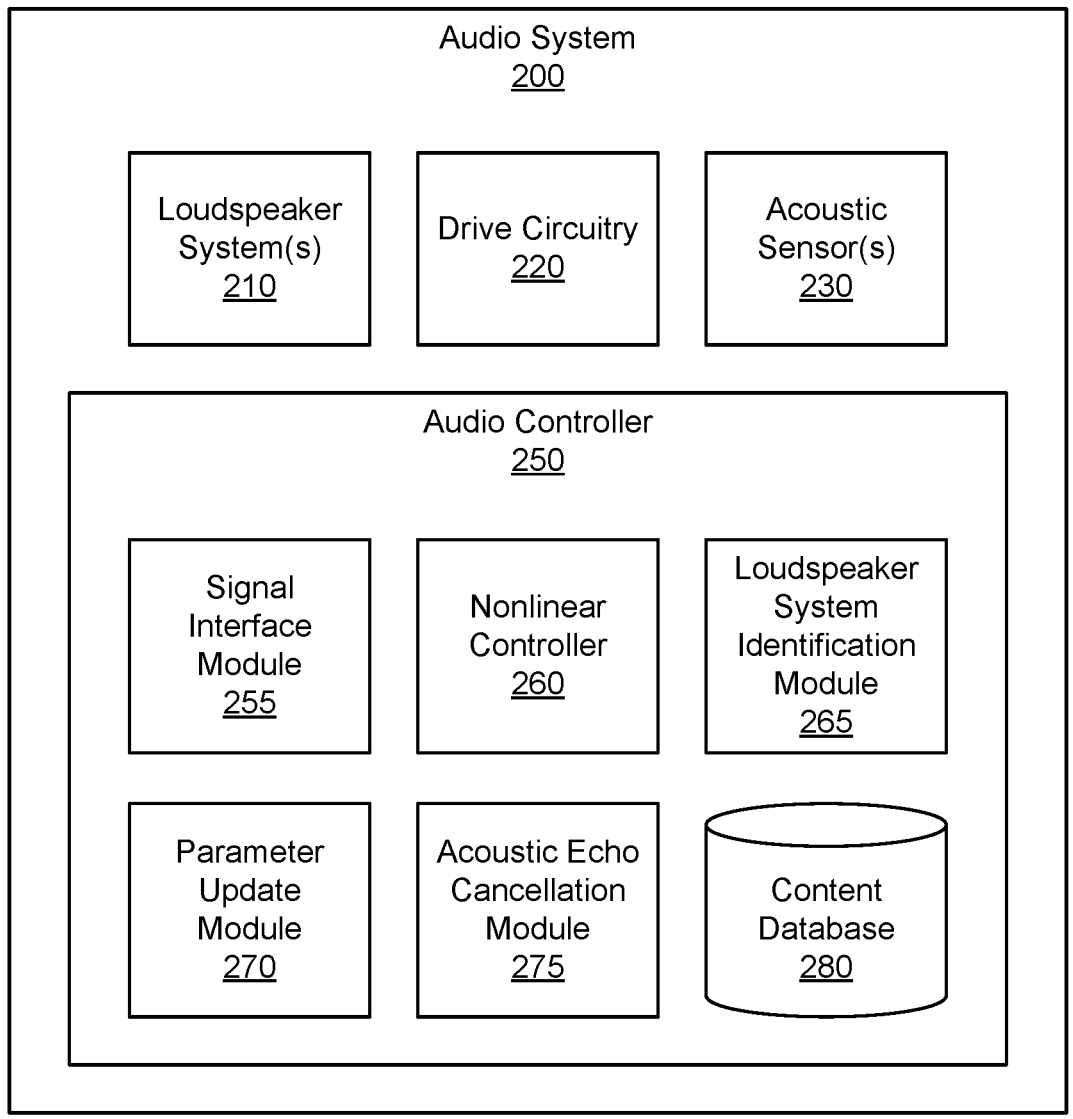
FIG. 2 is a block diagram of an audio system, in accordance with one or more embodiments.

FIG. 2 is a block diagram of an audio system 200, in accordance with one or more embodiments. The audio system 200 includes mechanical and electrical components used to produce sound as part of audio content provided to a user. The audio system of FIG. 1 is an embodiment of the audio system 200. The audio system 200 comprises one or more loudspeaker systems 210, drive circuitry 220, and an audio controller 250. The audio system 200 may further comprise one or more acoustic sensors 230, one or more tissue transducers (not shown), or some combination thereof. In other embodiments, the audio system 200 may comprise additional components, fewer components, different components, or some combination thereof. In other embodiments, the various functions described as performable by the components may be variably distributed between the components.

The one or more loudspeaker systems 210 are mechanical transducers configured to generate sound through mechanical actuation. The loudspeaker systems 210 may be an embodiment of the loudspeaker systems 160 in FIG. 1. The loudspeaker systems 210 convert electrical signals from the drive circuitry 220 to create mechanical actuation of a diaphragm using a voice coil. Each loudspeaker system 210 may include a port that directs the generated sound out into an environment. Each loudspeaker system 210 includes one or more loudspeaker system parameters that are mechanical and electrical characteristics of the loudspeaker. The loudspeaker system parameters may include linear and nonlinear parameters.

The loudspeaker system parameters for a given loudspeaker system 210 may include total mass, total stiffness, total mechanical resistance, another type of mechanical characteristic of the loudspeaker, electrical resistance, electrical inductance, force factor, another type of electrical characteristic, or some combination thereof. The total mass refers to the moving mass of the loudspeaker and radiation mass of the porting, wherein the moving mass refers to the mass of diaphragm and voice coil of the loudspeaker, wherein the diaphragm is oscillated to generate air pressure waves to produce sound. The total mass may be susceptible to variation (e.g., manufacturing tolerance), change based on environment (e.g., humidity or temperature may fluctuate mass) or change over time (e.g., with degradation or collecting particulates), or change when the loudspeaker porting is contaminated with dust which alters the radiation mass, providing a need to update the total mass. Non-linear loudspeaker system parameters may include displacement dependent nonlinear inductance, displacement dependent nonlinear force factor, displacement dependent nonlinear mechano-acoustic stiffness, other displacement dependent metrics, or some combination thereof.

The drive circuitry 220 is an electrical circuitry that provides an electrical signal to a loudspeaker system 210 to generate sound. The drive circuitry 220 includes electrical components for delivering the electrical signal to drive the loudspeaker systems 210. The drive circuitry 220 also includes one or more electrical components for measuring electrical characteristics across the loudspeaker system 210 as sensed signals. The electrical characteristics measurable by the drive circuitry 220 includes, but is not limited to, current and voltage across the loudspeaker system 210. The drive circuitry 220 may provide the measurements to the audio controller 250. In one or more embodiments, the drive circuitry 220 includes separate circuitry for each loudspeaker system 210. In embodiments with tissue transducers, the drive circuitry 220 may also provide electrical signals to the tissue transducers to generate sound.

The acoustic sensors 230 measure sound from an environment of the audio system 200. Each acoustic sensor 230 may be an embodiment of the acoustic sensors 180 in FIG. 1. Each acoustic sensor 230 is configured to detect sound and convert the detected sound into an electronic format (analog or digital), i.e., detected sound signals. The acoustic sensors 230 may be acoustic wave sensors, microphones, sound transducers, or similar sensors that are suitable for detecting sounds. The acoustic sensors 230 may provide the detected sound signals to the audio controller 250 for processing.

The audio controller 250 controls operation of the audio system 200. The audio controller 250 may be a general computing device comprising one or more processors and storage medium storing instruction for causing the processor to perform one or more operations. The audio controller 250 is an embodiment of the audio controller 150 of FIG. 1. The audio controller 250 comprises a signal interface module 255, a nonlinear controller 260, a loudspeaker system identification module 265, a parameter update module 270, an acoustic echo cancellation (AEC) module 275, and a content database 280. In other embodiments, the audio controller 250 may comprise additional modules/databases, fewer modules/databases, different modules/databases, or some combination thereof. In other embodiments, the various functions described as performable by the modules may be variably distributed between the modules.

The signal interface module 255 manages signals between the audio controller 250 and the other components of the audio system 200. The signal interface module 255 generates electrical signals for actuating the loudspeaker systems 210 and the acoustic sensors 230. The signal interface module 255 may retrieve audio content from the content database 280 and generate the electrical signals for the loudspeaker systems 210 based on loudspeaker system parameters. The signal interface module 255 may also receive sensed signals from the drive circuitry 220 including measurements of electrical characteristics measured across the loudspeaker systems 210. The signal interface module 255 may also receive the detected sound signals from the acoustic sensors 230. The signal interface module 255 may generate the electrical signals for actuating the loudspeaker systems 210 further based on the detected sound signals. For example, the signal interface module 255 may increase a volume in the electrical signals based on detecting lots of ambient noise in the environment from the detected sound signals.

The nonlinear controller 260 performs loudspeaker linearization to pre-distort the audio signal to prevent outputting nonlinear distortions in a nonlinear loudspeaker system 210. A nonlinear loudspeaker system is a loudspeaker system that has one or more nonlinear loudspeaker system parameters, which can introduce nonlinear distortions. A linearized output is linearly dependent on the input signal without any nonlinear distortions. A nonlinearized output includes nonlinear distortions, i.e., distortions that are not linearly dependent on the input signal. The nonlinear controller 260 receives an input signal corresponding to audio content to be output by the loudspeaker system 210. The input signal may comprise the acoustic waves to be generated by the loudspeaker system 210. Example input signals include various audio content items, e.g., present in the content database 280.

The nonlinear controller 260 may precondition the audio signal in two steps. In the first step, a linear dynamics module may input the audio signal and output a displacement of the loudspeaker diaphragm. The linear dynamics module may preserve the linear response of the loudspeaker system 210. The linear dynamics module may output the displacement of the loudspeaker diaphragm based on one or more linear loudspeaker system parameters. According to an example implementation, the linear dynamics module may calculate the displacement of the loudspeaker diaphragm according to the following equation:

$$x[n] = \sigma_x\left(Bl\frac{1}{R_{eb}}(w[n-1] - Bl*u[n-1])\right) - a_1x[n-1] - a_2x[n-2] \quad (1)$$

In Equation 1, x[n] is the displacement of the loudspeaker diaphragm, $\sigma_x$, $\alpha_1$, and $\alpha_2$ and infinite impulse response (IIR) filter coefficients, Bl is the force factor, $R_{eb}$ is the blocked electrical resistance, w[n] represents the input signal, and u[n] represents the loudspeaker diaphragm velocity. In the second step, an inverse nonlinear dynamics module inputs the displacement of the loudspeaker diaphragm from the linear dynamics module and outputs the control voltage, or the pre-distorted signal that preserves the nonlinear properties of the loudspeaker system 210. The inverse nonlinear dynamics module may output the pre-distorted signal based on one or more nonlinear loudspeaker system parameters. According to an example implementation, the inverse nonlinear dynamics module may calculate the pre-distorted signal according to the following equation:

$$v_c[n] = R_{eb}\left(\frac{1}{Bl(x[n])}\right) \quad (2)$$

$$\left(\frac{1}{\sigma_x}(x[n+1] + a_1x[n] + a_2x[n-1]) + k(x[n])x[n]\right) + Bl(x[n])u[n]\right)$$

In Equation 2, (in addition to variables described above) Bl(x[n]) refers to the nonlinear loudspeaker parameter of displacement-dependent nonlinear force factor, and k(x[n]) refers to nonlinear stiffness minus the DC component, i.e., the linear component independent on displacement. The nonlinear stiffness can be represented by a polynomial as a weighted sum of different order of displacement from the 0th order (the DC component). K(x[n]) is the full polynomial removing the 0th order displacement term.

Figure 5:
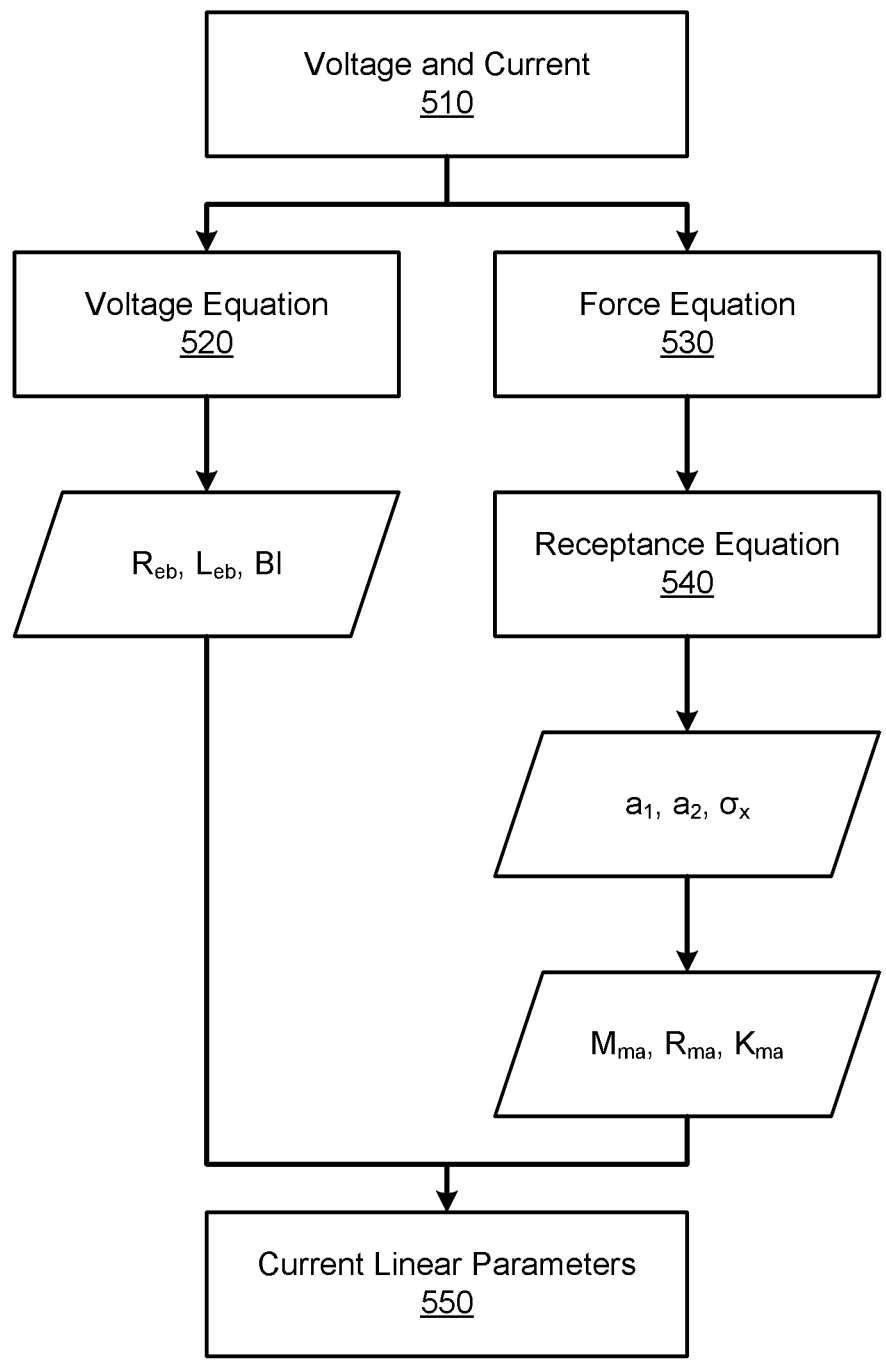
FIG. 5 is a flowchart illustrating a process for loudspeaker system identification and parameter updating, in accordance with one or more embodiments.

The loudspeaker system identification module 265 determines one or more loudspeaker system parameters based on the sensed signals from the drive circuitry 220. The loudspeaker system identification module 265 utilizes one or more equations interrelating one or more of the loudspeaker system parameters, including a total mass of the loudspeaker. The loudspeaker system identification module 265 calculates the loudspeaker system parameters from the one or more equations. In one or more embodiments, a first equation is based on the measured voltage across the loudspeaker system 210 including blocked electric resistance, blocked electric inductance, and force factor as loudspeaker system parameters. In one or more embodiments, a second equation is based on a ratio of displacement over force and includes infinite impulse response (IIR) filter coefficients as loudspeaker system parameters. In one or more embodiments, a third equation is based on loudspeaker system resonance frequency and includes the infinite impulse response filter coefficients, loudspeaker stiffness, moving mass as loudspeaker system parameters. In one or more embodiments, a fourth equation interrelates the IIR filter coefficients, the loudspeaker stiffness, moving mass, radiation mass, and frequency. The loudspeaker system identification module 265 can fix one or more loudspeaker system parameters, assuming no variation. The loudspeaker system identification module 265 determines a plurality of loudspeaker system parameters based on the one or more equations. FIG. 5 below further details loudspeaker system identification, in accordance with one or more embodiments.

The parameter update module 270 updates one or more of the loudspeaker system parameters. The parameter update module 270 calculates an error between an expected signal and a measured signal. The parameter update module 270 may determine the measured signal based on the current and the voltage measured across the loudspeaker system 210. The parameter update module 270 updates one or more of the loudspeaker system parameters based on the calculated error. The parameter update module 270 may further adjust one or more quality factors based on the parameters, one or more other characteristics of the loudspeaker, or some combination thereof. The parameter update module 270 may provide the tuned parameter, quality factors, characteristics, or some combination thereof to the signal interface module 255 to generate the electrical signals for generating the sound. As an example of a quality factor, the parameter update module 270 tunes the compliance of the loudspeaker which is a reciprocal of the stiffness. The parameter update module 270 provides updates loudspeaker system parameters to the signal interface module 255 to generate the electrical signals.

In one or more embodiments, the parameter update module 270 adjusts the determine loudspeaker system parameters according to a recursive function. The recursive function calculates the updated value of a loudspeaker system parameter based on the current value of the loudspeaker system parameter with a corrective step that is based on the calculated error (and may further be based on a convergence hyperparameter). The convergence hyperparameter determines large the corrective step is.

The parameter update module 270 may routinely update one or more of the loudspeaker system parameters. For example, the parameter update module 270 may update every ten seconds or so. In other examples, the periodicity may be longer, e.g., updating every couple of weeks or another period on the order of weeks/months. On any given update iteration, the parameter update module 270 may choose to update a subset of the loudspeaker system parameters. For example, only updating the moving mass loudspeaker system parameter.

The AEC module 275 performs acoustic echo cancellation on an overall signal captured by the acoustic sensor(s). The overall signal may comprise a target signal and an acoustic path response of the output audio content, or one or more echoes of the output audio content. The acoustic path response of the output audio content comprises one or more echoes from the output audio content reflecting off surfaces in an environment of the audio system 200 before arriving at the acoustic sensor 230. The overall signal may further comprise ambient noise from the environment. The AEC module 275 filters out the acoustic path response of the output audio content to isolate the target signal. The AEC module 275 may utilize the input signal that generates the output audio content by the loudspeaker system 210 to identify an acoustic path response captured in the overall signal. Once the acoustic path response of the output audio content is identified in the overall signal, the AEC module 275 can filter out or remove the acoustic path response of the output audio content, thereby isolating the target signal. The target signal may be further processed by the audio controller 150 to refine the signal, e.g., noise removal. The target signal may be provided to the content database 280 for storage. In other embodiments, the target signal may be transmitted to another audio system (or audio device) for presentation. As an example, two users may be in telecommunication with one another utilizing respective audio systems 200. As the first user speaks, the target signal is transmitted to the second user's audio system for presentation. As the first user's target signal is presented over the second user's audio system, the second user's audio system performs acoustic echo cancellation to prevent capturing an acoustic path response of the first user's target signal presented over the second user's audio system.

The content database 280 stores audio content that may be provided to a user of the audio system 200. In one or more embodiments, the audio content includes sounds to be generated by the audio system 200, e.g., via the loudspeaker systems 210. The signal interface module 255 may generate the electrical signals for actuating the loudspeakers based on the audio content. The content database 280 may obtain audio content from an external system via a network, e.g., streaming music from a music-sharing platform.

The user may opt-in to allow the content database 280 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

Acoustic Echo Cancellation and Loudspeaker Linearization

Figure 3:
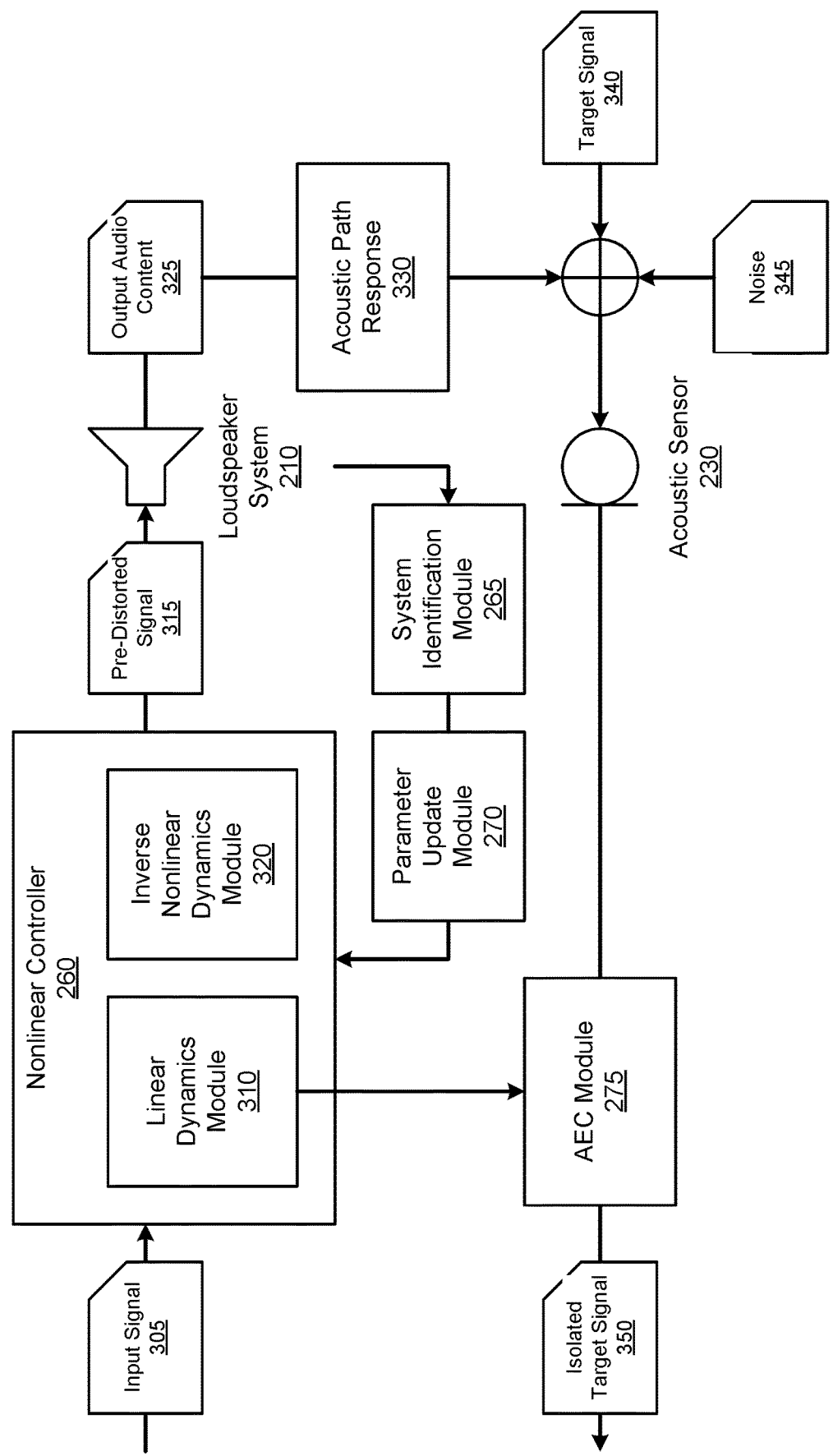
FIG. 3 is an overview flowchart illustrating a process for performing acoustic echo cancellation with loudspeaker linearization, in accordance with one or more embodiments.

FIG. 3 is an overview flowchart illustrating a process 300 for performing acoustic echo cancellation with loudspeaker linearization, in accordance with one or more embodiments. The process 300 is performed by the audio system 200. In other embodiments, the flowchart 300 includes additional, fewer, or different steps than shown in FIG. 3. Acoustic echo cancellation refers to the process of utilizing the input signal as a reference in identifying and removing an acoustic path response of the output audio content. Loudspeaker linearization refers to the process of pre-distorting an input signal to preserve nonlinearity of the loudspeaker system while preventing outputting of nonlinear distortions by the nonlinear loudspeaker system.

The audio system 200 accesses an input signal 305 corresponding to an output audio content 355 to be presented by the loudspeaker system 210. The input signal 305 generally comprises the acoustic waves comprising the output audio content.

The nonlinear controller 260 inputs the input signal 305 and outputs a pre-distorted signal 315. The pre-distorted signal 315 is generated by the nonlinear controller 260 to accommodate the nonlinearity of the loudspeaker system 210, e.g., when driven at high voltages to maximize sound output. The nonlinear controller 260 may comprise two modules: a linear dynamics module 310 and an inverse nonlinear dynamics module 320. The linear dynamics module 310 inputs the input signal 305 and outputs a displacement of the loudspeaker diaphragm based on linear loudspeaker system parameters. The inverse nonlinear dynamics module 320 inputs the displacement of the loudspeaker diaphragm and outputs the pre-distorted signal 315 based on the nonlinear loudspeaker system parameters.

The loudspeaker system 210 is driven according to the pre-distorted signal 315 which outputs linearized output audio content 325. The loudspeaker system 210 may include a plurality of loudspeaker system parameters, including one or more linear loudspeaker system parameters, one or more nonlinear loudspeaker system parameters, or some combination thereof.

The system identification module 265 calculates current loudspeaker system parameters. The system identification module 265 may utilize sensed signals (e.g., by the drive circuitry 220) including a voltage and/or a current of the loudspeaker system 210. With the sensed signals, the system identification module 265 can calculate the loudspeaker system parameters. Further description relating to example equations that may be used to calculate the loudspeaker system parameters is further described in conjunction with FIGS. 4 & 5.

The parameter update module 270 updates the loudspeaker system parameters based on an error between the expected signal and the measured signal. The expected signal may correspond to the pre-distorted signal 315, i.e., the voltage driving the loudspeaker system 210 to generate the output audio content 325. The measured signal is based on the sensed signals. The parameter update module 270 may iteratively update the loudspeaker system parameters based on the sensed signals. The parameter update module 270 provides the updated loudspeaker system parameters to the nonlinear controller 260 which effects generation of the pre-distorted signal 315.

The acoustic sensor 230 captures an overall signal from the environment. The overall signal may comprise an acoustic path response 330 of the output audio content 325 and a target signal 340 (e.g., from a user). The overall signal may further comprise noise 345 from the environment.

The AEC module 275 performs acoustic echo cancellation to filter out the acoustic path response 330 of the output audio content 325 to isolate the target signal 340. The AEC module 275 utilizes the input signal 305 as a reference to determine expected echoes or the expected acoustic path response 330 for the output audio content 325. The AEC module 275 removes the expected echoes from the overall signal to yield the isolated target signal 350. In other embodiments, additional components in the audio system 200 may perform noise cancellation or other processing techniques to refine the desired target signal 340. In one or more embodiments, the AEC module 275 utilizes a linear adaptive filter that adjusts the acoustic echo cancellation based on a difference between expected acoustic path response 330 and the overall signal captured. In so doing, the linear adaptive filter is able to optimize the acoustic echo cancellation as the acoustic path response 330 changes. Adjusting the acoustic echo cancellation may include modifying a waveform of the expected acoustic path response, adding or removing a waveform of the expected acoustic path response, shifting a timestamp of a waveform of the expected acoustic path response, adjusting a magnitude of a waveform of the expected acoustic path response, adjusting a frequency of a waveform of the expected acoustic path response, adjusting another characteristic of any waveform of the expected acoustic path response.

Loudspeaker System Identification & Parameter Updating

Figure 4:
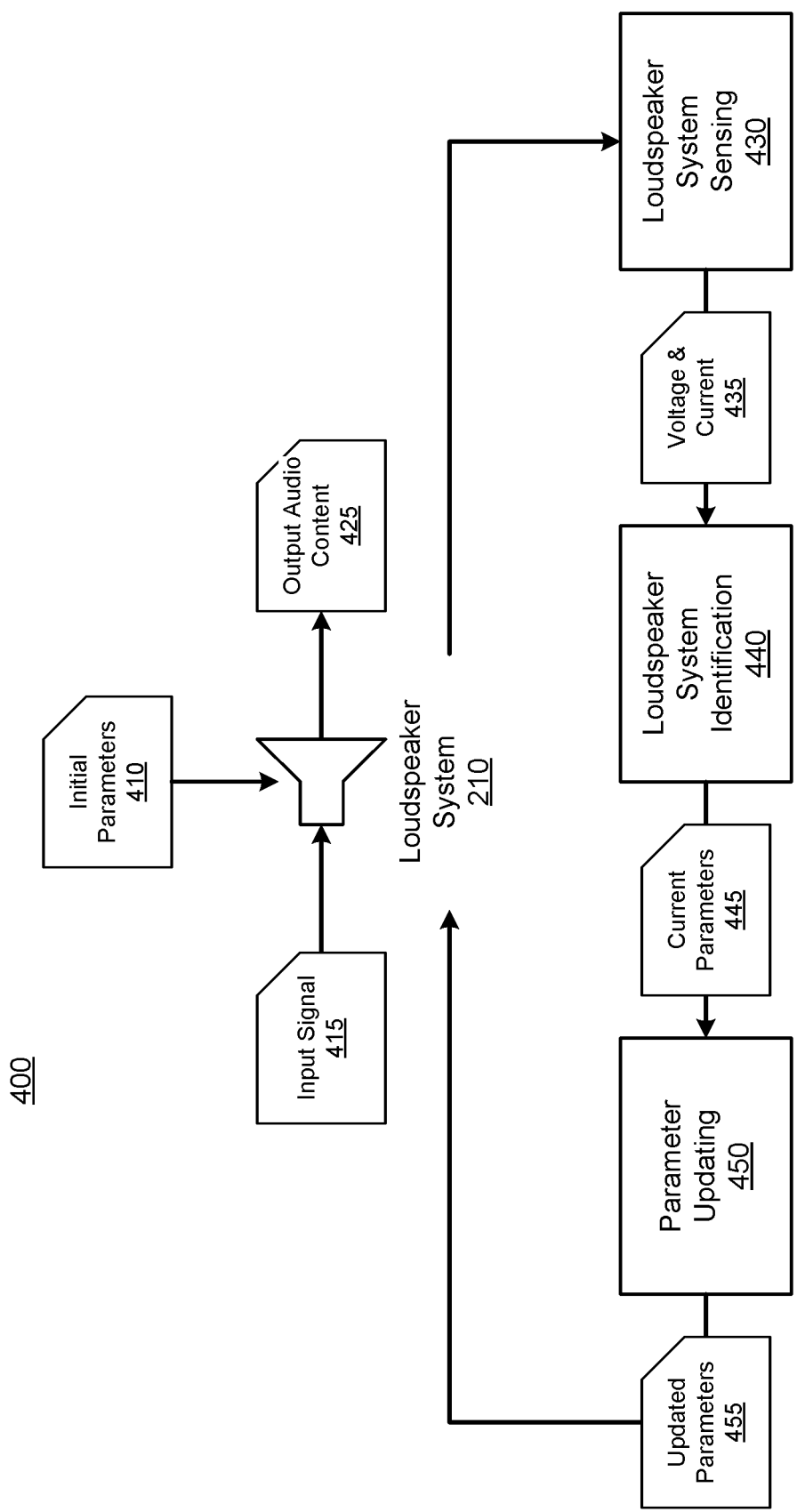
FIG. 4 is an overview flowchart illustrating a process for performing linear acoustic echo cancellation and system linearization of a nonlinear loudspeaker system, in accordance with one or more embodiments.

FIG. 4 is an overview flowchart illustrating a process 400 for providing audio content while dynamically adjusting loudspeaker system parameters, in accordance with one or more embodiments. The loudspeaker system identification and parameter updating is performed by the audio system 200 for the loudspeaker system 210. In other embodiments, the flowchart 400 includes additional, fewer, or different steps than shown in FIG. 4.

The audio system 200 may begin with initial parameters 410. The initial parameters 410 may be values for the loudspeaker system parameters as set by a manufacturer of the loudspeaker system 210. With an input signal 415, the audio system 200 may generate electrical signals based on the initial parameters 410, that actuate the loudspeaker system 210 to generate sound to deliver audio content 425.

The audio system 200 may perform loudspeaker system sensing 430 to measure electrical signals across the loudspeaker system 210 during generation of the sound. The driving circuit 220 may measure the electrical signals, including current and voltage 435.

The audio system 200 proceeds with loudspeaker system identification 440 to determine the current parameters 445 for the loudspeaker system 210. The audio system 200 may utilize one or more equations interrelating two or more of the loudspeaker system parameters. The audio system 200 utilizes the equations to calculate one or more of the loudspeaker system parameters using the voltage and current 435. FIG. 5 below further details loudspeaker system identification, in accordance with one or more embodiments.

The audio system 200 performs parameter updating 450 based on the current parameters 445. The audio system 200 may calculate an error as a difference between an expected signal and a measured signal based on the voltage and current 435. The audio system 200 utilizes the error to update one or more of the loudspeaker system parameters. In one or more embodiments, the audio system 200 updates parameters with a recursive function based on the current value of a loudspeaker system parameter and a corrective step based on the error. The corrective step may be further based on a convergence hyperparameter. The audio system 200 may further adjust one or more quality factors based on the parameters, one or more other characteristics of the loudspeaker, or some combination thereof. In one or more embodiments, the audio system 200 may determine and update a subset of loudspeaker system parameters while fixing a remainder of loudspeaker system parameters. As the audio system 200 updates the parameters, the loudspeaker system 210 may generate output audio content 425 more accurately to the input signal 415.

The audio system 200 may iteratively perform cycles of loudspeaker system identification and parameter updating to minimize the error between the expected signal the measured signal. In effect, the audio system 200 can more precisely generate sound as intended, saving energy from overdriven loudspeakers and improving user experience with high fidelity sound. For example, if a total mass of a loudspeaker system 210 has never been updated, and is significantly larger than the initial value, then the audio system 200 may be applying too little energy to drive the loudspeaker system 210 creating poor user experience from decreased output. Or, for example, the total mass of a loudspeaker system 210 is lower than what the audio system 200 anticipates the total mass to be, such that the audio system 200 is overdriving the loudspeaker system 210, thereby wasting energy and potentially applying an excessive force to the loudspeaker system 210.

The improved system identification algorithm is more widely applicable with the capability of updating the total mass parameter in addition to the other parameters. The tuning is also more robust given the added parameter. By updating the total mass, the audio system can determine whether the porting has been clogged with dust which degrades the audio performance. Upon determining that the porting is clogged, the audio system can generate and provide a notification to the user to clean the porting. In addition, as the total mass determines the loudspeaker system sensitivity, updating the total mass provides a more accurate power prediction for battery powered devices.

FIG. 5 is a flowchart 500 illustrating a process for determining loudspeaker linear parameters, in accordance with one or more embodiments. The flowchart 500 is performable by the audio controller 250, or more specifically the loudspeaker system identification module 265 of the audio controller 250 using the voltage and current 510 measured across the loudspeaker system 210. The audio controller 250 determines a plurality of loudspeaker system parameters by utilizing one or more equations to calculate the plurality of loudspeaker system parameters. In the embodiment shown, the audio controller 250 determines six loudspeaker system parameters $R_{eb}$, $L_{eb}$, Bl, $M_{ma}$, $R_{ma}$, and $K_{ma}$.

The audio controller 250 utilizes a voltage equation 520 to determine $R_{eb}$, $L_{eb}$, and Bl. $R_{eb}$ refers to electrical resistance of the loudspeaker. $L_{eb}$ refers to electrical inductance of the loudspeaker. Bl refers to the force factor of the loudspeaker. The voltage equation relied upon is:

$$v_c(t) = R_{eb}i(t) + L_{eb}\frac{di(t)}{dt} + Bl\frac{dx(t)}{dt} \quad (3)$$

$v_c$ refers to the voltage driving the loudspeaker system 210; i(t) refers to the measured current; and x (t) refers to displacement of the diaphragm. With the above equation, the audio controller 250 can determine $R_{eb}$, $L_{eb}$, and Bl. The audio controller 250 may iteratively sample the loudspeaker system's measured signal. With the plurality of samples of the loudspeaker system's measured signal, the audio controller 250 may fit the samples, e.g., by performing least mean square to find the best fit for the samples. Example sampling frequency may be 58 kHz yielding a potential of 58,000 samples per second.

The audio controller 250 utilizes a force equation 530 to determine $M_{ma}$, $R_{ma}$, and $K_{ma}$. $M_{ma}$ refers to total mass of the loudspeaker system; $R_{ma}$ refers to mechanical resistance of the loudspeaker system; and $K_{ma}$ refers to the stiffness of the loudspeaker system. The audio controller 250 starts with the force equation as:

$$f_c(t) = M_{ma}\frac{d^2x(t)}{dt^2} + R_{ma}\frac{dx(t)}{dt} + K_{ma}x(t) \tag{4}$$

In the force equation, $f_c$ refers to the force acting on the loudspeaker system 210.

The audio controller 250 also utilizes a receptance equation 540 to calculate IIR filter coefficients as intermediaries to calculating the $M_{ma}$, $R_{ma}$, and $K_{ma}$. The receptance equation leverages a ratio of displacement to force, which may be expressed in terms of IIR filter coefficients ($\alpha_1$, $\alpha_2$, and $\sigma_x$) as:

$$\frac{x[z]}{f_c[z]} = \frac{\sigma_x z^{-1}}{1 + a_1 z^{-1} + a_2 z^{-2}} \tag{5}$$

Operating on this model lessens dependence between ox and the other coefficients $\alpha_1$ and $\alpha_2$. The variable z represents the z-domain, which encompasses discrete time signals (also referred to as sampled time signals). With these IIR filter coefficients, the audio controller can determine $M_{ma}$ (total mass) in addition to $R_{ma}$ (total mechanical resistance) and $K_{ma}$ (total stiffness). In one or more embodiments, the least mean square (LMS) method is used to iteratively update the parameters. The coefficient ox can be further represented in terms of the other coefficients $\alpha_1$ and $\alpha_2$ and $K_{ma}$:

$$\sigma_x = \frac{1 + a_1 + a_2}{K_{ma}} \tag{6}$$

This audio controller 250 can calculate $K_{ma}$ knowing $\alpha_1$, $\alpha_2$, and $\sigma_x$. Now armed with $\alpha_1$, $\alpha_2$, $\sigma_x$, and $K_{ma}$ the audio controller 250 can calculate $M_{ma}$ and $R_{ma}$ using a loudspeaker system resonance frequency equation and a loudspeaker system damping ratio equation. The loudspeaker system resonance frequency equation may be as follows:

$$\omega_0 = \sqrt{\frac{K_{ma}}{M_{ma}}} = \sqrt{(\ln\sqrt{a_2})^2 + \tan^{-2}\left(\frac{\sqrt{4a_2 - a_1^2}}{-a_1}\right)} \tag{7}$$

The audio controller 250 can calculate $M_{ma}$ with the above loudspeaker system resonance frequency equation. The loudspeaker system resonance damping ratio equation can be represented as:

$$\zeta = \frac{R_{ma}}{2\sqrt{M_{ma}K_{ma}}} = -\frac{F_s \ln\sqrt{a_2}}{\omega_0} \tag{8}$$

The audio controller 250 thereafter calculates $R_{ma}$.

Upon finishing the calculations, the audio controller 250 has determined the current loudspeaker linear parameters: $R_{eb}$, $L_{eb}$, Bl, $M_{ma}$, $R_{ma}$, and $K_{ma}$.

Example Method

FIG. 6 is a flowchart illustrating the method 600 of acoustic echo cancellation with loudspeaker linearization, in accordance with one or more embodiments. Although the method 600 is described in the perspective of the audio system 200, it can be understood that, for each step of the method 600, one or more of the components of the audio system 200 may perform that step. In other embodiments, the method 600 may include additional steps, fewer steps, different steps, or some combination thereof.

The audio system 200 generates 610 a pre-distorted signal from an input signal that keeps a nonlinear loudspeaker system in a linear regime. The loudspeaker system may naturally introduce nonlinearity distortions in an input signal, e.g., when the loudspeaker system is driven at a high voltage. The input signal corresponds to an audio content to be delivered, e.g., presented to a user of the audio system. The audio system 200 generates the pre-distorted signal based on the loudspeaker system parameters.

The audio system 200 delivers 620, via the loudspeaker system, the audio content in the linear regime using the pre-distorted signal. The pre-distorted signal prevents the loudspeaker system from introducing nonlinear distortions.

The audio system 200 may perform 630 system identification and parameter updating. The audio system 200 may sense signals of the loudspeaker system, including voltage and/or current. With the sensed signals, the audio system 200 may calculate current loudspeaker system parameters. The audio system 200 may then update the loudspeaker system parameters based on an error between an expected signal and a measured signal. The updated loudspeaker system parameters may be utilized in the generation of the pre-distorted signal.

The audio system 200 captures 640, via an acoustic sensor, an overall signal comprising an acoustic path response of the delivered audio content and a target signal. The overall signal may further comprise ambient noise of the environment.

The audio system 200 filters 650 out the acoustic path response of the delivered audio content from the overall signal yielding an isolated target signal. The audio system 200 may filter the acoustic path response using adaptive linear filtering relying on the input signal as a reference for identifying the expected acoustic path response (or echoes). The linear filtering may adapt based on a comparison of the overall signal to the expected acoustic path response. The audio system 200 may perform one or more additional filtering steps, e.g., to remove noise, to refine the isolated target signal.

The audio system 200 performs 660 an action with the isolated target signal. The audio system 200 may utilize the target signal for a variety of purposes. In some embodiments, the target signal may be voice commands by the user. In such embodiments, the audio system 200 may comprise components for speech recognition to decipher the voice command. In other embodiments, the target signal may be a recorded audio content to be shared with other users, e.g., on a social platform. In such embodiments, the target signal may be recorded as a user-generated audio content and stored in the content database for sharing to other users. In yet other embodiments, the target signal may be used for telecommunication (an audio call, a video and audio call, etc.) between two different audio systems. The target signal is received by the first audio system and transmitted to another audio system for presentation.

Example System Environment

Figure 7:
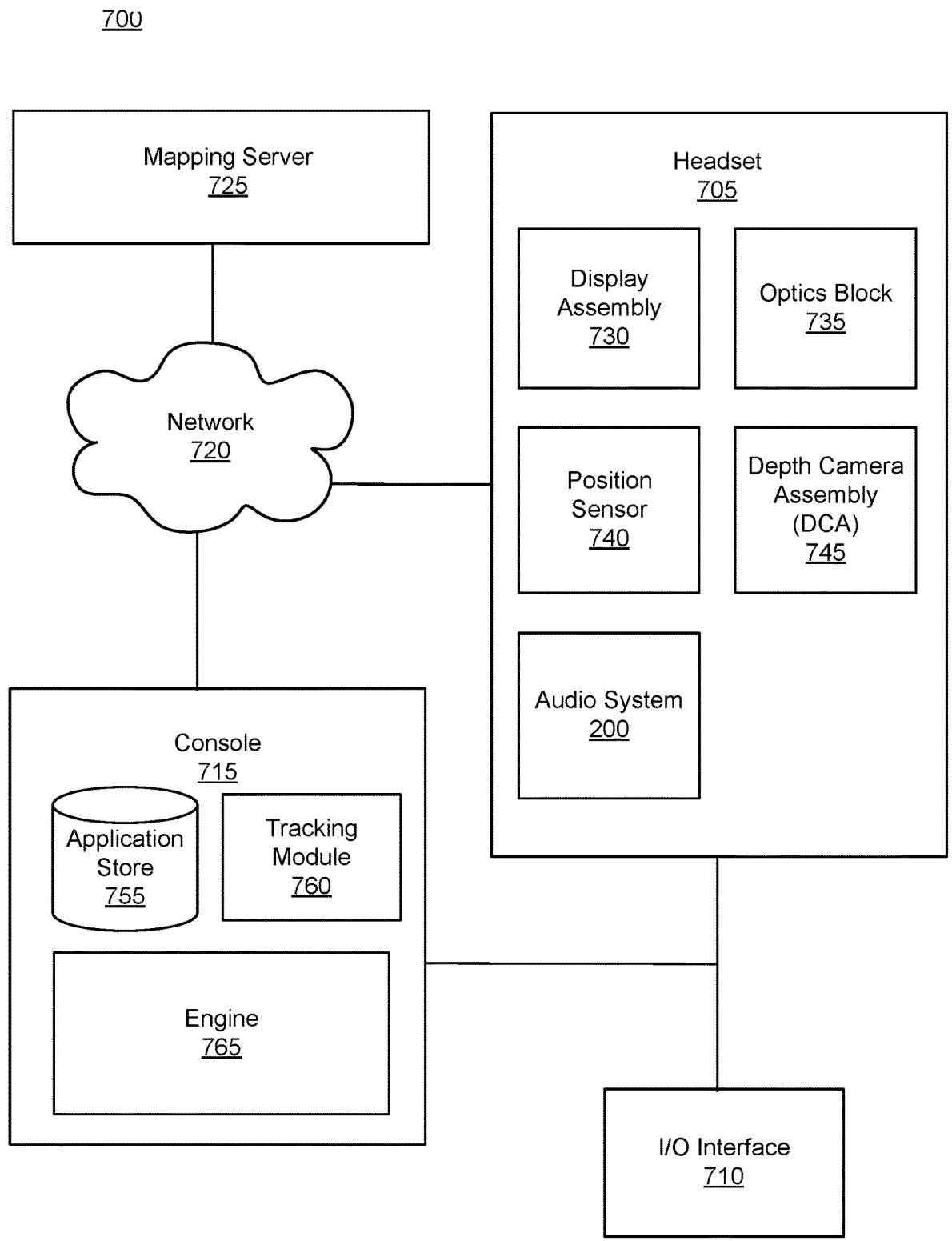
FIG. 7 is an example system environment of a headset including an audio system, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, the DCA 745, and the audio system 200. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 200 comprises a transducer array for delivering audio content to a user of the headset 705. The transducer array includes at least one loudspeaker system. In some embodiments, the transducer array further comprises tissue transducers. The audio system 200 may further comprise an acoustic sensor array comprising one or more acoustic sensors configured to capture audio signals from the environment. The audio system 200 performs acoustic echo cancellation with loudspeaker linearization. The loudspeaker linearization ensures linearized audio content is output by the loudspeaker system, thereby allowing for the acoustic echo cancellation to accurately filter out the acoustic path response of the delivered content. This allows the loudspeaker system to be driven at high voltages, maximizing its performance potential while capturing high-fidelity audio signals free of echoes.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    generating a pre-distorted signal from an input signal that keeps a nonlinear loudspeaker system in a linear regime;
    delivering, via the loudspeaker system, audio content in the linear regime using the pre-distorted signal;
    capturing, via an acoustic sensor, an overall signal comprising an acoustic path response of the delivered audio content and a target signal;
    filtering out the acoustic path response of the delivered audio content from the overall signal yielding isolated target signal; and
    performing an action with the isolated target signal.

2. The computer-implemented method of claim 1, further comprising:
performing system identification to determine one or more loudspeaker system parameters of the nonlinear loudspeaker system, wherein generating the pre-distorted signal is based on the one or more loudspeaker system parameters.

3. The computer-implemented method of claim 2, wherein performing system identification comprises:
measuring a current and a voltage across the nonlinear loudspeaker system using a drive circuitry configured to drive actuation of the loudspeaker system and to sense the current and the voltage; and
calculating the one or more loudspeaker system parameters based on the current and the voltage.

4. The computer-implemented method of claim 2, further comprising:
updating one or more loudspeaker system parameters based on an error as a difference between the pre-distorted signal and a measured signal based on the current and the voltage.

5. The computer-implemented method of claim 1, wherein generating the pre-distorted signal from the input signal comprises:
determining diaphragm displacement from the output audio signal based on one or more linear loudspeaker system parameters; and
determining the pre-distorted signal as a driving voltage of the nonlinear loudspeaker system from the diaphragm displacement based on one or more nonlinear loudspeaker system parameters.

6. The computer-implemented method of claim 1, wherein the acoustic path response of the delivered audio content is in the linear regime.

7. The computer-implemented method of claim 1, wherein filtering out the acoustic path response comprises performing linear adaptive filtering based on the input signal as reference.

8. The computer-implemented method of claim 7, wherein the linear adaptive filtering is adjustable based on a difference between an expected acoustic path response and the overall signal captured by the acoustic sensor.

9. The computer-implemented method of claim 1, wherein the action comprises determining a voice command from user speech as the target signal.

10. The computer-implemented method of claim 1, wherein the action comprises transmitting user speech as the target signal to another audio system for presentation.

11. A non-transitory computer-readable storage medium storing instructions that, when executed by a computer processor, cause the computer processor to:
generate a pre-distorted signal from an input signal that keeps a nonlinear loudspeaker system in a linear regime;
deliver, via the loudspeaker system, audio content in the linear regime using the pre-distorted signal;
capture, via an acoustic sensor, an overall signal comprising an acoustic path response of the delivered audio content and a target signal;
filter out the acoustic path response of the delivered audio content from the overall signal yielding isolated target signal; and
perform an action with the isolated target signal.

12. The non-transitory computer-readable storage medium of claim 11, wherein the instruction further cause the computer processor to:
perform system identification to determine one or more loudspeaker system parameters of the nonlinear loudspeaker system, wherein generating the pre-distorted signal is based on the one or more loudspeaker system parameters.

13. The non-transitory computer-readable storage medium of claim 12, wherein to perform system identification comprises to:
measure a current and a voltage across the nonlinear loudspeaker system using a drive circuitry configured to drive actuation of the loudspeaker system and to sense the current and the voltage; and
calculate the one or more loudspeaker system parameters based on the current and the voltage.

14. The non-transitory computer-readable storage medium of claim 12, wherein the instruction further cause the computer processor to:
update one or more loudspeaker system parameters based on an error as a difference between the pre-distorted signal and a measured signal based on the current and the voltage.

15. The non-transitory computer-readable storage medium of claim 11, wherein to generate the pre-distorted signal from the input signal comprises to:
determine diaphragm displacement from the output audio signal based on one or more linear loudspeaker system parameters; and
determine the pre-distorted signal as a driving voltage of the nonlinear loudspeaker system from the diaphragm displacement based on one or more nonlinear loudspeaker system parameters.

16. The non-transitory computer-readable storage medium of claim 11, wherein the acoustic path response of the delivered audio content is in the linear regime.

17. The non-transitory computer-readable storage medium of claim 11, wherein to filter out the acoustic path response comprises to perform linear adaptive filtering based on the input signal as reference.

18. The non-transitory computer-readable storage medium of claim 17, wherein the linear adaptive filtering is adjustable based on a difference between an expected acoustic path response and the overall signal captured by the acoustic sensor.

19. The non-transitory computer-readable storage medium of claim 11, wherein the action comprises one of:
determining a voice command from user speech as the target signal; and
transmitting user speech as the target signal to another audio system for presentation.

20. An audio system comprising:
a nonlinear loudspeaker system;
an acoustic sensor; and
an audio controller configured to:
generate a pre-distorted signal from an input signal that keeps the nonlinear loudspeaker system in a linear regime,
deliver, via the loudspeaker system, audio content in the linear regime using the pre-distorted signal,
capture, via the acoustic sensor, an overall signal comprising an acoustic path response of the delivered audio content and a target signal,
filter out the acoustic path response of the delivered audio content from the overall signal yielding isolated target signal, and
perform an action with the isolated target signal.

* * * * *